United States Patent
Kumar et al.

(10) Patent No.: US 8,316,386 B2
(45) Date of Patent: Nov. 20, 2012

(54) MULTIPLE APPLICATION INTEGRATION

(75) Inventors: Subodh Kumar, Hyderabad (IN); Vinay Kumar, Hyderabad (IN); Neha Bhayana, Uttar Pradesh (IN); Ashwani Jindal, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1708 days.

(21) Appl. No.: 11/357,308

(22) Filed: Feb. 17, 2006

(65) Prior Publication Data

US 2007/0198988 A1    Aug. 23, 2007

(51) Int. Cl.
G06F 9/44 (2006.01)
G06F 9/00 (2006.01)

(52) U.S. Cl. ........................... 719/328; 709/218

(58) Field of Classification Search ............. 719/328
See application file for complete search history.

(56) References Cited

U.S. PATENT DOCUMENTS

| | | | |
|---|---|---|---|
| 6,256,676 B1 | 7/2001 | Taylor et al. | |
| 6,738,975 B1 | 5/2004 | Yee et al. | |
| 6,851,104 B1* | 2/2005 | Rodrigues da Silva | 717/104 |
| 2002/0046301 A1* | 4/2002 | Shannon et al. | 709/328 |
| 2002/0198800 A1 | 12/2002 | Shamrakov | |
| 2003/0018832 A1 | 1/2003 | Amirisetty et al. | |
| 2004/0034846 A1* | 2/2004 | Ortal et al. | 717/111 |
| 2004/0044987 A1 | 3/2004 | Kompalli et al. | |
| 2004/0045013 A1 | 3/2004 | Lam | |
| 2004/0158842 A1 | 8/2004 | Gilfix et al. | |
| 2005/0015619 A1* | 1/2005 | Lee | 713/201 |
| 2005/0033588 A1 | 2/2005 | Ruiz et al. | |
| 2005/0049882 A1 | 3/2005 | Sawka | |
| 2005/0060610 A1 | 3/2005 | Leary et al. | |
| 2005/0120353 A1 | 6/2005 | Zhang et al. | |
| 2005/0149941 A1 | 7/2005 | Watson et al. | |
| 2005/0198121 A1 | 9/2005 | Daniels et al. | |
| 2005/0228803 A1 | 10/2005 | Farmer et al. | |

OTHER PUBLICATIONS

Bhaskaran, et al., "An e-Business Integration & Collaboration Platform for B2B e-Commerce," IEEE 2001, http://csdl2.computer.org/persagen/DLAbsToc.jsp?resourcePath=/dl-proceedings/&toc=comp/proceedings/wecwis/2001/1224/00/1224toc.xml&DOI=10.1109/WECWIS.2001.933913.

Chahuneau et al., "SGML Template Driven Database Extraction: A New Approach to Report Generation," http://www.oasis-open.org/cover/chahuneauSGML96.html.

* cited by examiner

*Primary Examiner* — Andy Ho
*Assistant Examiner* — Abdou Seye

(57) ABSTRACT

An application integration system used to integrate a plurality of applications includes a plurality of integration adapters, each communicating with an application and an integration engine including a messaging broker, an integration database and a schema mapping database. The application integration system also uses a plurality of tools and components interactively working with the messaging broker. The application integration system allows integrating various applications and at the same time provides ease of change to users of such applications by providing a framework that may be used to customize and configure integrations leading to significant reduction in total cost of ownership to the businesses.

18 Claims, 7 Drawing Sheets

MULTIPLE APPLICATION INTEGRATION

BACKGROUND

Computers and computer software make up a very important part of modern life and business. In today's business environment, for any organization to stay competitive, it is imperative that it uses computers and software applications to manage data, customers, employees, finances, etc. Generally speaking, organizations use specialized application to use one or more of their various operations.

For example, businesses use accounting software to manage their accounting, tax, payroll, and other accounting related functions, whereas customer relationship management (CRM) software is used to manage customer accounts, orders, etc. Most businesses implement their core enterprise applications such as enterprise resource planning (ERP) and CRM at different times, using products developed by different vendors. This results in the problem of how to integrate disparate systems in most cost effective, efficient and effective manner.

For example, a business may be using an ERP system to manage inventory and a separate CRM system to manage customer data. In such a scenario, when a new customer account is created in the CRM system, its attached item order may not be automatically and immediately reflected in the ERP system. Similarly, when delivery of an item is received in the inventory system, it may not be automatically applied to backlog of orders received in the CRM system. Such lack of communication and data sharing between various applications may result in considerable loss of efficiency and competitiveness for businesses.

One solution to the problem of integrating such disparate applications is to custom develop solutions that facilitate communication and sharing of data between such disparate applications. For example, an integration developer may develop custom application that interacts with both of the CRM and the ERP to keep them apprised of any changes in the data that need to be shared among them. However, developing and constantly updating such custom integration application is time consuming and costly.

Several business integration products, such as Microsoft™ BizTalk™, Tivoli™, etc., provide framework to integrate a number of business applications. However, such integrations products are technically complex and because they require special expertise on the part of the end user business, they increase the total cost of ownership (TCO) on the part of small to medium business entities using such products. Therefore, there is a need to provide an application integration framework that allows for integrating several business applications in highly automated and yet cost effective manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An application integration system used to integrate a plurality of applications includes a plurality of integration adapters, each communicating with an application and an integration engine including a messaging broker, an integration database and a schema mapping database. The application integration system also uses a plurality of tools and components interactively working with the messaging broker. The application integration system allows integrating various applications and at the same time provides ease of change to users of such applications by providing a framework that may be used to customize and configure integrations leading to significant reduction in total cost of ownership to the businesses.

An alternate embodiment of the application integration system performs the various functions such as identifying compound document, breaking down compound document into simple messages, determining if any pre-action needs to be applied to the simplified messages, applying schema mapping to the simplified messages, applying various default values to the simplified messages and applying any post-action procedures to the messages outside of the messaging broker. In such an implementation an adapter proxy within the integration engine may be used to communicate the outgoing message from the integration engine to any destination application.

In an alternate embodiment of the application integration system, the integration engine may also include a data synchronization module which may allow a user to synchronize data between a plurality of applications. The data synchronization tool may allow a user to synchronize two applications when first implemented using the integration system by allowing user to bring the current status of various data between such two applications in synchrony with each other.

An alternate embodiment of the application integration system includes an integration monitor that allows a user to monitor the status of data transfer between a plurality of applications. Using the integration monitor, a user may monitor the status of any set of data being transferred at various stages of such transfer. For example, the integration monitor allows the user to monitor when a record is being transferred from a first application to a second application, whether proper set of pre-action and post-action procedures were applied to the record or not.

Yet another embodiment of the application integration system provides a settings administration module which allows a user to set various default settings for the use of the application integration system. Using the settings administration module, a user may set various default values to be applied by the default value application module, various post-action to be applied to the data being transferred through the integration engine, etc. Additionally, using the administration module, a user may add new entities for integration, update mapping logic of existing entities and deploy the updated mapping logic.

BRIEF DESCRIPTION OF DRAWINGS

The present patent is illustrated by way of examples and not limitations in the accompanying figures, in which like references indicate similar elements, and in which.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term 'defined term' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Network

Figure 1:
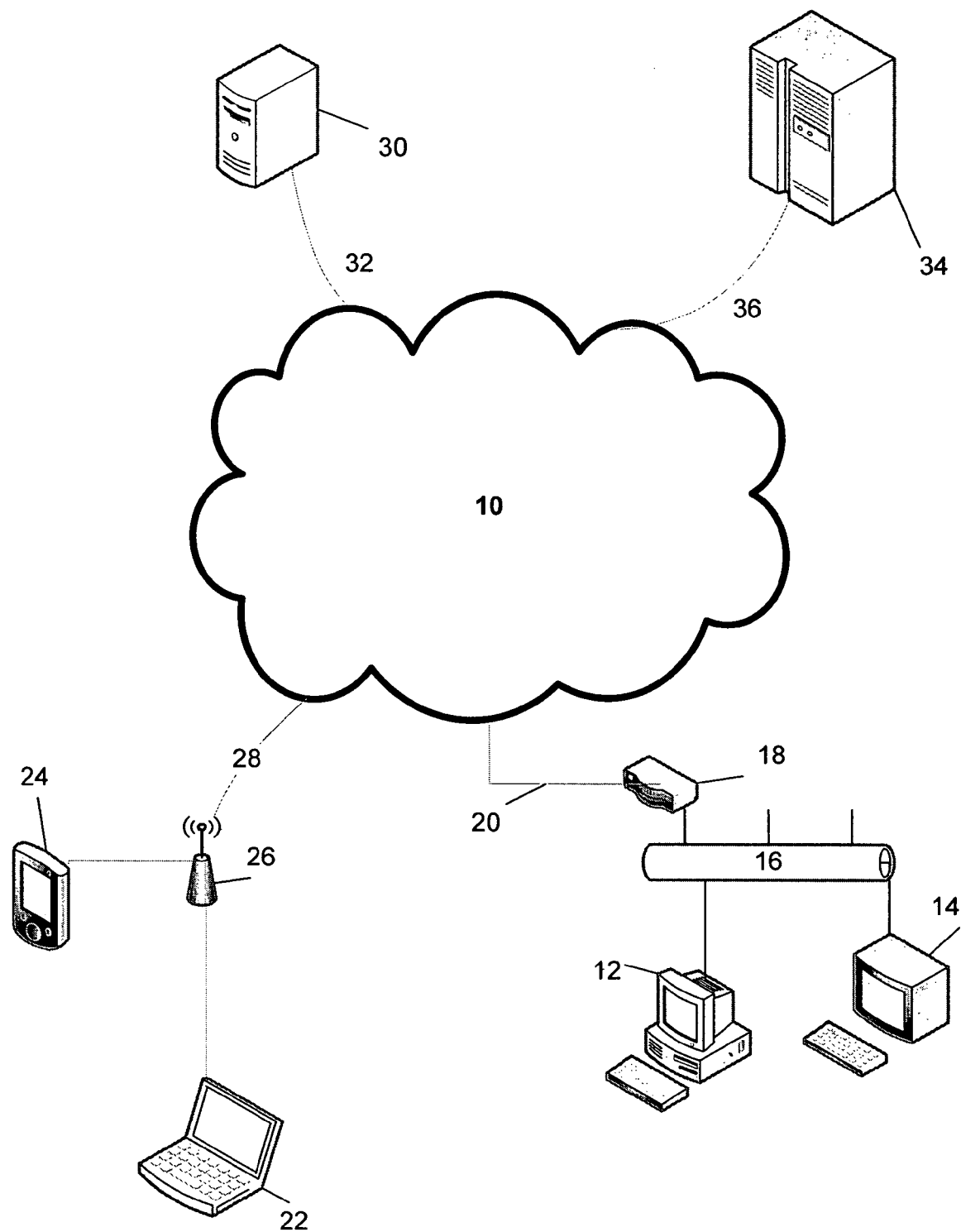
FIG. 1 is a block diagram of a network interconnecting a plurality of computing resources.

FIG. 1 illustrates a network 10 that may be used to implement an application integration system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the application integration system may be stored and operated on any of the various devices connected to the network 10. For example, a first application and a second application using the application integration system described in here may be located on two different nodes on the network 10, while the network integration system itself may be implemented on the server 30. As one of ordinary skill in the art would recognize, the application integration system may be implemented using a number of different combinations of the nodes of network 10.

Computer

Figure 2:
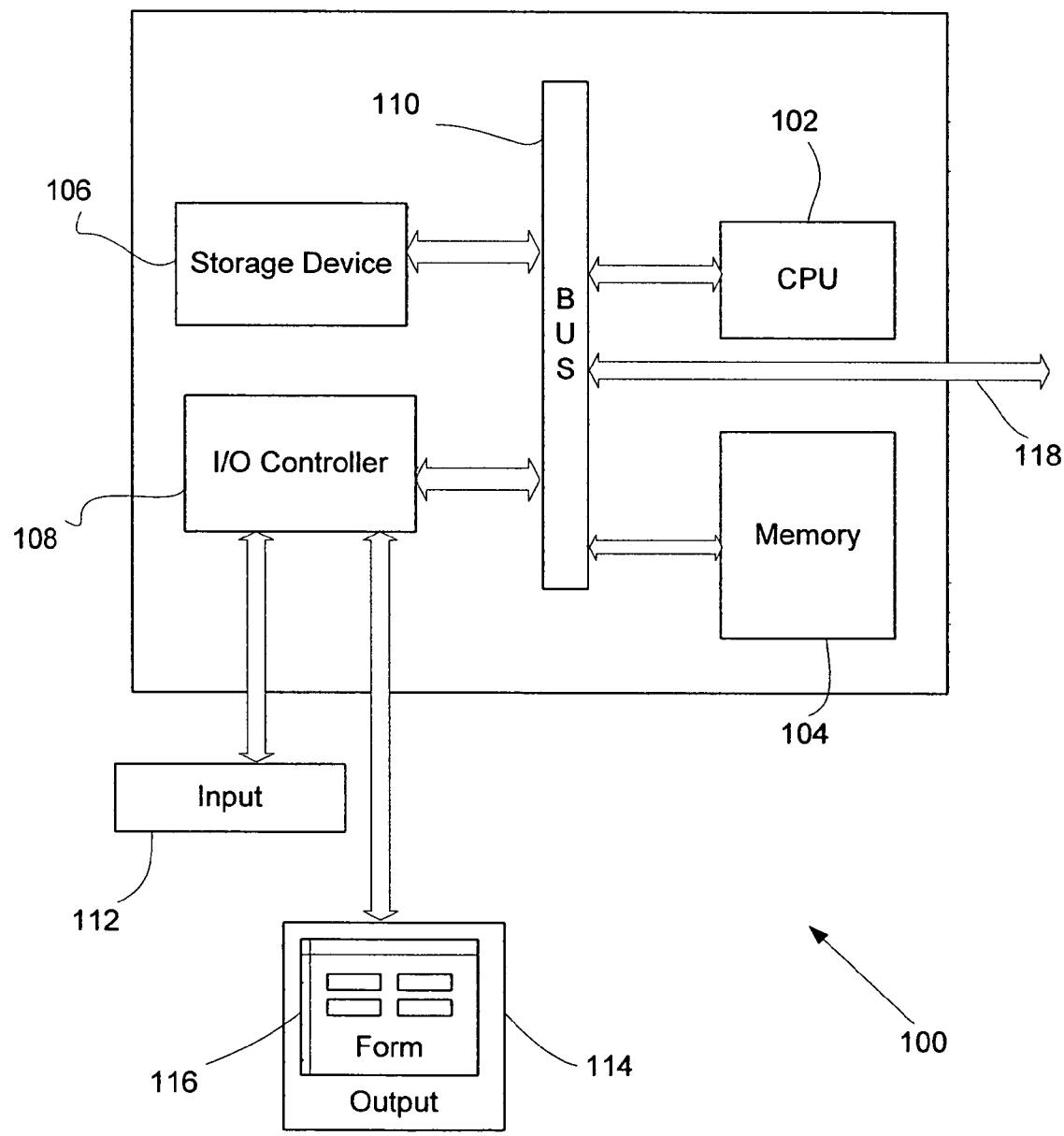
FIG. 2 is a block diagram of a computer that may be connected to the network of FIG. 1.

FIG. 2 illustrates a computing device in the form of a computer 100 that may be connected to the network 10 and used to implement one or more components of an application integration system described herein. Components of the computer 100 may include, but are not limited to a central processing unit (CPU) 102, a memory 104, a storage device 106, an input/output controller 108, and a system bus 110 that couples various system components including the memory to the CPU 102. The system bus 110 may be any of several types of bus structures including a memory bus or memory controller, a peripheral bus, and a local bus using any of a variety of bus architectures.

The memory 104 may include computer storage media in the form of volatile and/or nonvolatile memory such as read only memory (ROM) and random access memory (RAM). A basic input/output system (BIOS), containing the basic routines that help to transfer information between elements within computer 110, such as during start-up, is typically stored in ROM. RAM typically contains data and/or program modules that are immediately accessible to and/or presently being operated on by processing unit 102. The memory 104 may also be used to store data related to one or more programs codes used by the computer 100 and/or the application integration system described herein.

The storage device 106 may typically include removable/non-removable, volatile/nonvolatile computer storage media. By way of example only, the storage device 106 may include a hard disk drive, a magnetic disk drive, nonvolatile magnetic disk 152, an optical disk drive, etc. One or more of the forms stored on the memory 104 may be populated using data stored on the storage device 106. The I/O controller may be used by the computer 100 to communicate with an input device 112, which may be a keyboard, a mouse, etc., an output device 114, which may be a monitor, a printer, etc.

Application Integration System

Figure 3:
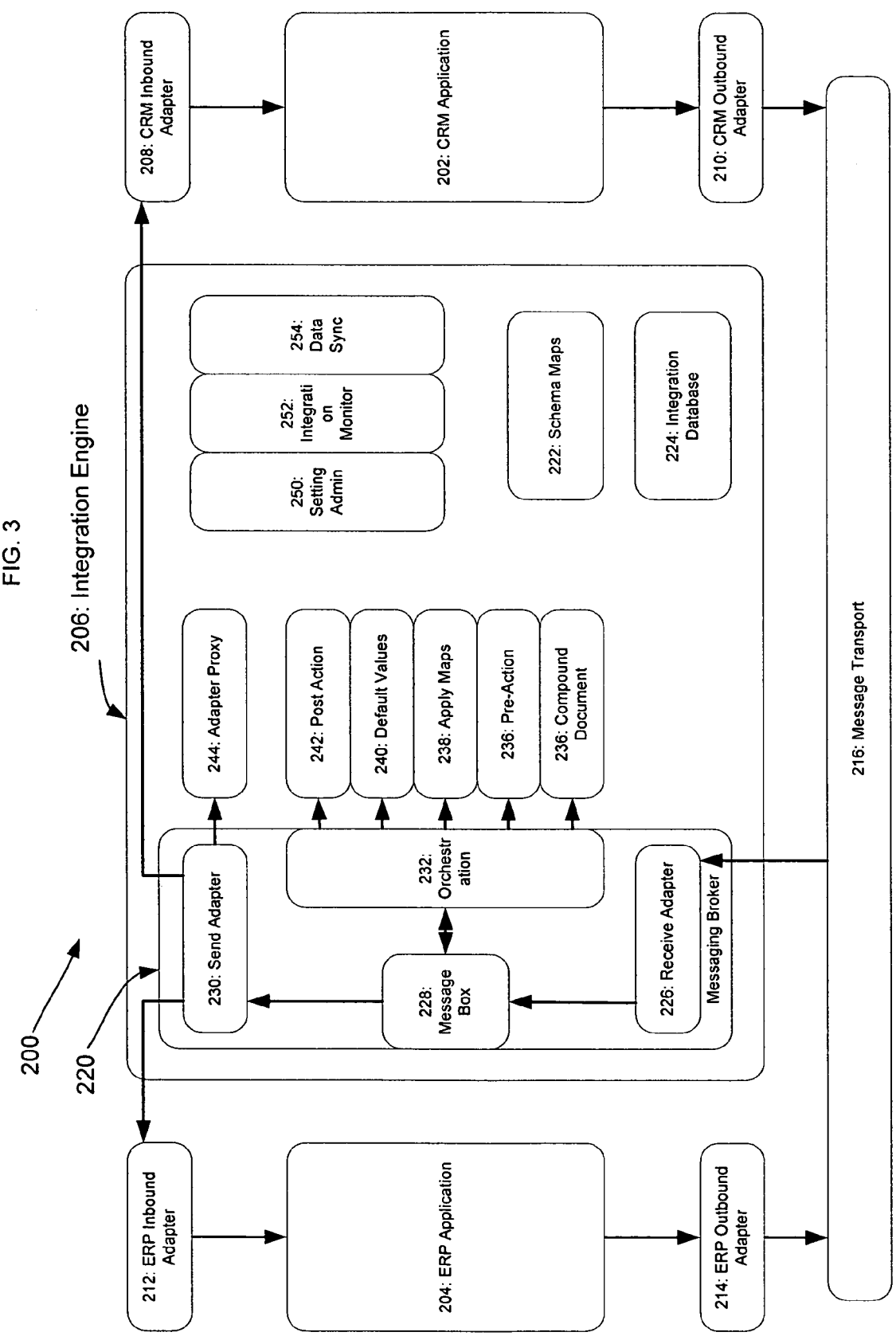
FIG. 3 illustrates an example block diagram of an application integration system.

FIG. 3 illustrates a block diagram of an example implementation of an application integration system 200. The application integration system 200 is shown to be used in integrating a customer relationship management (CRM) system 202 to an enterprise resource planning (ERP) system 204. However, any other application such as an accounting application, a human resource management system, etc., may be integrated using the application integration system 200. Moreover, while the current implementation is shown to integrate only two applications, an alternate implementation may be used to integrate a larger number of applications with each other. Moreover, as one of ordinary skill in the art would recognize, any of the various blocks of the application integration system 200 may be implemented using software, hardware, firmware or any combination thereof. Similarly, the various sections of the application integration system 200 may be implemented on various nodes of the network 10. For example, the CRM application 202 may be running on a server node of the network 10, while the ERP application 204 may be running on a computer node of the network 10.

Now referring to FIG. 3, the application integration system 200 may include an integration engine 206, a CRM inbound adapter 208, a CRM outbound adapter 210, an ERP inbound adapter 212, an ERP outbound adapter 214, and a message transport module 216. The CRM application 202 and the ERP application 204 may send messages to the integration engine 206 via their respective outbound adapters 210 and 214 and the message transport module 216. The integration engine 206 may send messages to the CRM application 202 and the ERP application 204 via their respective inbound adapters 208 and 212. The adapters 208-214 may be internal to the integration engine 206 or they may be provided as separate modules operating with their respective applications.

The integration engine 206 includes a messaging broker 220, a plurality of components interacting with the messaging broker 220, a plurality of tools facilitating a user's interactions with the integration engine 206, a schema mapping module 222 and an integration database 224. The messaging broker 220 includes a receive adapter 226, a message box 228, a send adapter 230 and an orchestration module 232. The receive adapter 226 may pick up messages from the message transport module 216 and store the message in the message box 228. The orchestration module 232 may pick up messages from the message box 228 based on any predetermined criteria to process such messages. Once the message is processed according to the various components of the integration engine 206, it is communicated to its destination application by the send adapter 230.

The orchestration module 232 interacts with a compound document module 234, a pre-action module 236, a map application module 238, a default value application module 240, and a post-action module 242 to process various messages received in the message box. Specifically, after selecting a message to be processed, the orchestration module 232 it activates the compound document module 234, which determines if the message is a compound document or a simple document. A compound document may contain information about various entities that may contain several simple messages. The compound document module 234 may decide the sequence of simple messages contained in such entities to preserve referential integrity of data in the destination application. If the message is determined to be a compound document, the compound document module 234 breaks it down into a number of simple documents for further processing. For example, if the compound document module 234 determines that the message indicates that four new contacts were generated in the message generating application, it breaks it down into four separate messages, each representing a single contact generation message.

Subsequently the orchestration module 232 invokes the pre-action module 236 to determine if any dependent messages need to be processed before the message being currently processed and if so determined, it puts the message being currently processed into a queue before further processing. Once it is determined that a particular message is ready to be processed, the orchestration module 232 invokes the map application module 238. The map application module 238 uses one more mapping schema stored in the schema mapping module 222 to generate an outgoing message in response to the message being currently processed.

The mapping schema may be, for example, a dynamic link library (DLL) assembly file that processes a message from a message generating application to a message that need to be sent to the message destination application. For example, if the incoming message indicates that a new account has been created in the message generating application, such as the CRM application 202, the mapping schema may generate a message to a destination application, such as an ERP application 204 that a new account needs to be generated and passes the parameters from the incoming message to the destination application for generating such an account.

Once a mapping schema has been applied to a message, the orchestration module 232 invokes the default value application module 240. The default value application module 240 may be provided a number of default values from an administrator during the setting up of the integration engine 206. The default value application module 240 applies one or more such default values to the outgoing message. Subsequently, the orchestration module 232 invokes the post-action module 242. The post-action module 242 may use any customer logic that may need to be applied to the outgoing message, where such customer logic may be provided by the administrator during the setting up of the integration engine 206.

The integration engine 206 also includes a setting administration module 250, an integration monitor 252 and a data synchronization module 254. The setting administration module 250 may be used by an administrator to set up any default values, to set up any post-action rules that need to be applied to an outgoing message, etc. The integration monitor 252 may be used by an administrator to monitor the functioning of the integration engine 206. Using the integration monitor 252, the administrator can ensure that each of the modules 234-242 are properly functioning to transform an incoming message to an outgoing message.

The data synchronization module 254 may be used by an administrator to synchronize two applications with each other using the integration engine 206. For example, using the data synchronization module an administrator can perform initial set up of two applications so that various data in both applications are synchronized.

The integration database 224 may store information about the applications being integrated. For example, the integration database 224 may store information about the entities which are integrated, information about what kind of messages should be determined to be compound documents, etc. The integration database 224 may also store message related information that may be used by the integration monitor 252. Furthermore, the integration database 224 may also store settings configured by the setting administration tool 250, pre-action information to be used by the pre-action module 236, additional schema maps used by the integration engine 206, various default values stored in the integration database, etc.

Figure 4:
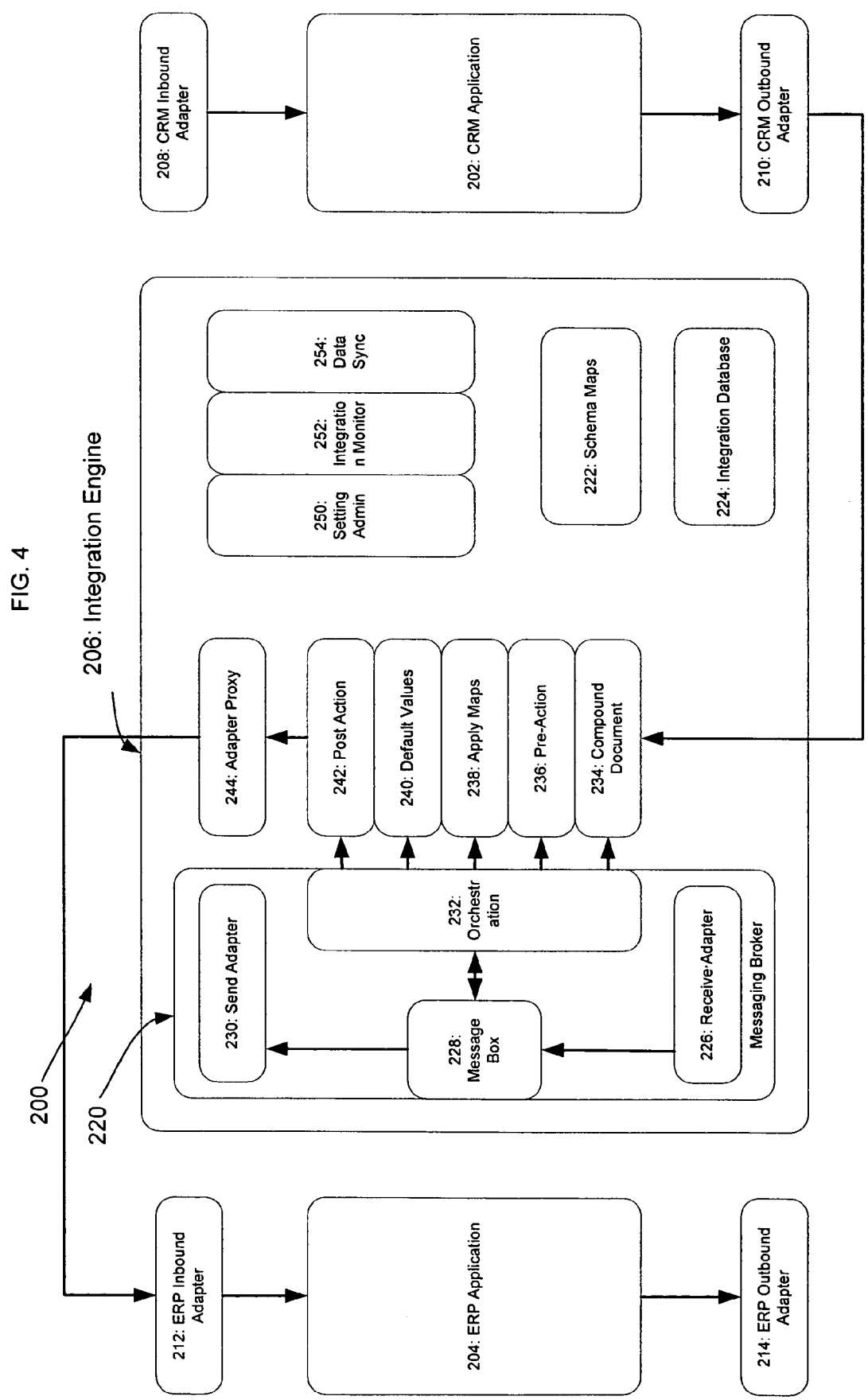
FIG. 4 illustrates an example block diagram of an alternate embodiment of an application integration system.

Now referring to FIG. 4, it illustrates an alternate implementation of the application integration system 200 of FIG. 3. A number of blocks in FIG. 4 are similar to the blocks in FIG. 3 and therefore are referred to by the same numerals as used in FIG. 3. One of the major differences between the implementations illustrated in FIGS. 3 and 4 is that while the integration engine 206 as illustrated in FIG. 3 has the messaging broker 220 receiving an incoming message and the messaging broker 220 performing the transformation, the integration engine 206 as illustrated in FIG. 4 has the transformation of the incoming message performed outside the messaging broker 220. Thus as illustrated in FIG. 4, the messaging broker 206 may merely monitor the performance of the various components 234 to 242. Upon completion of the transformation, the adapter proxy module 244 may communicate the outgoing message to the destination application.

The functioning of the application integration system 200 is described below in FIG. 5 by showing an integration of an update to the CRM application 202 into the ERP application 204. However, as one of ordinary skill in the art would recognize, the application integration system 200 may also be equally used to integrate an update into the ERP application 204 into the CRM application 202. Similarly, in an alternate implementation, an update into the CRM application 202 may be integrated simultaneously into the ERP application 204 and one or more other applications working with the application implementation system 200.

Figure 5:
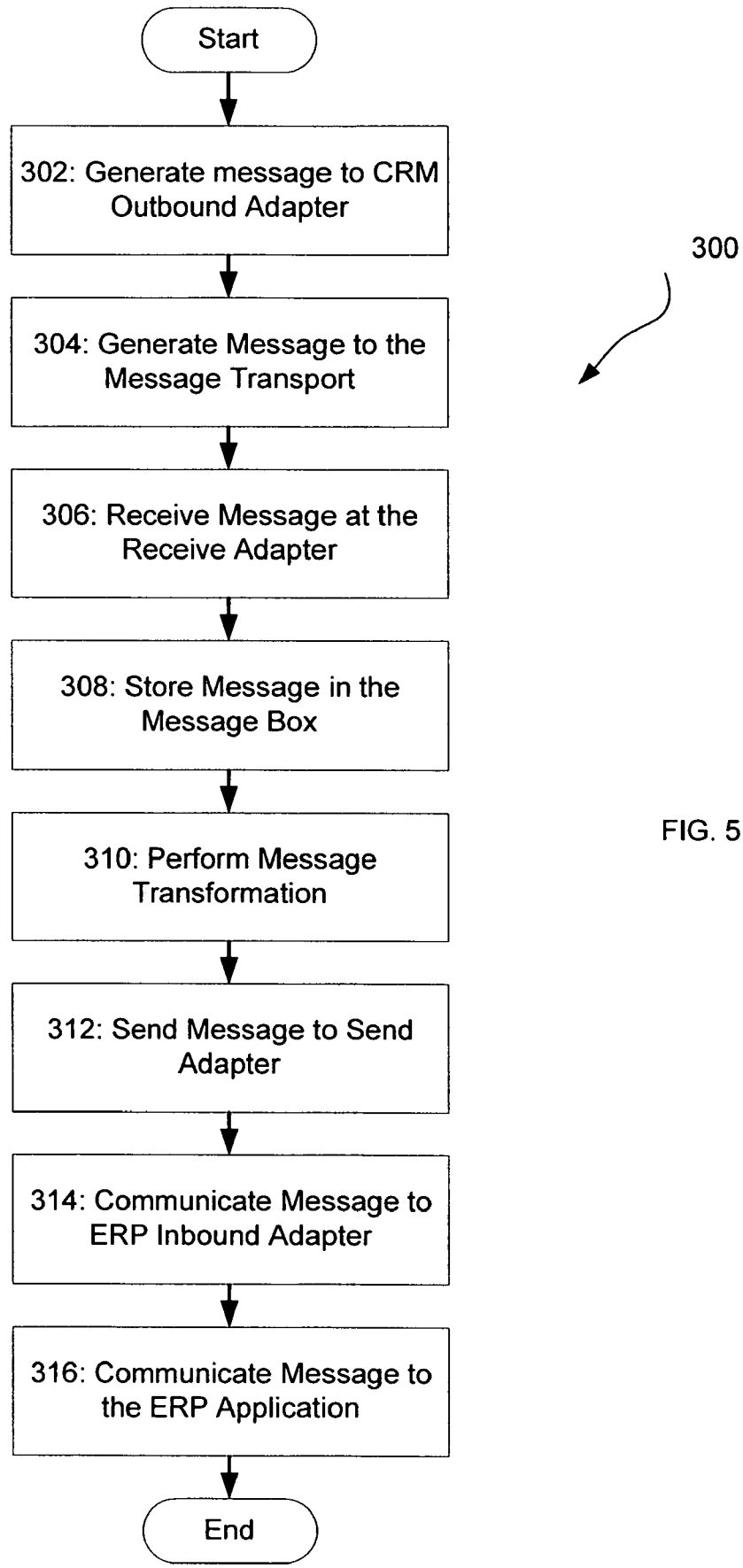
FIG. 5 illustrates an example flowchart of an application integration program.

FIG. 5 illustrates a flowchart of an application integration program 300 using the various components of the application integration systems described in FIGS. 3 and 4. The application integration program 300 is illustrated to show transformation of a message from the CRM application 202 and communicating of the transformed message to the ERP application 204. However, as one of ordinary skill in the art would recognize, similar program may provide transformation of a message from the ERP application 204 and communication of the message to the CRM application 202 as well.

At a block 302 the CRM application 202 recognizes that a new record has been created by a user and therefore it generates a message to the CRM outbound adapter 210 informing of such record creation. In response to the message from the CRM application 202, at a block 304 the CRM outbound adapter 210 submits a message to the message transport module 216. The receive adapter 226 of the messaging broker 220 may be constantly listening to the message transport 216 and therefore, at a block 306 the receive adapter 226 picks up the message from the message transport 216.

At a block 308 the receive adapter 226 stores the incoming message in the message box 228. Subsequently, at a block 310, the orchestration module 232 picks up the message from the message box in accordance with any predetermined criteria and performs message transformation using the various components 234-242. The process of message transformation is described in further detail below in FIG. 6.

Upon completion of the message transformation, at a block 312, the transformed message is sent to the send adapter 230. The send adapter 230 identifies the destination application for the transformed message and, at a block 314, the send adapter 230 communicates the message to the inbound adapter of the destination application. In the implementations illustrated in here the destination application is the ERP application 204, therefore, at the block 314, the transformed message is sent to the ERP inbound adapter 212. Note that if the integration engine 206 was implemented as illustrated in FIG. 4, at the block 312, the adapter proxy 244 would communicate the transformed message to the inbound adapter of the destination application.

Subsequently, at a block 316, the destination application undertakes any requisite action in response to the transformation message, such as creation of a record, updating of a record, deletion of a record, etc., which would result in the destination application being synchronized to the application originating the message to the integration engine 206.

Figure 6:
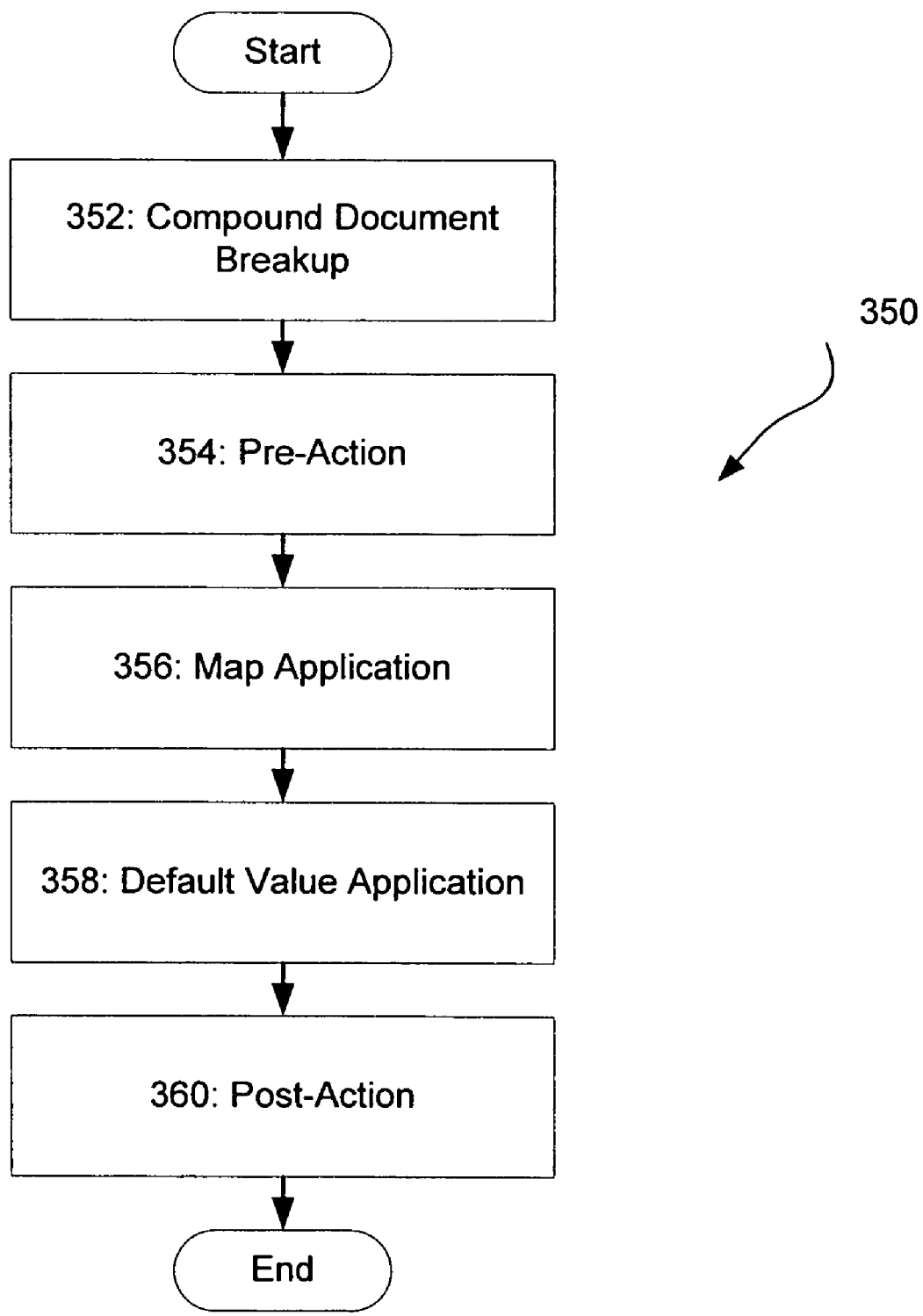
FIG. 6 illustrates an example flowchart of a message transformation program.

Now referring to FIG. 6, an exemplary flowchart illustrates functioning of a message transformation program 350 that is undertaken at the block 310. At a block 352, the orchestration module 232 invokes the compound document module 234, which determines if the incoming message is a compound document or a simple document, if the incoming document is a compound document, the compound document module 234 breaks down the compound document into a series of simple documents.

Subsequently, at a block 354, the incoming simple document or the simple document received from the compound document module 234 is processed by the pre-action module 236. The pre-action module determines if before transforming of a message if any pre-action need to be applied to such a message or not. For example, the pre-action module 236 may determine that according to specified pre-action logic, a dependent message need to be generated before processing of the current message.

After being processed by the pre-action module 236, at a block 356 any transformation mapping in applied to the message by the map application module 238. The map application module 238 may select a transformation mapping schema from the schema mapping module 222 based on the message type, the originating application, the destination application, any user specified special logic, etc., and perform the transformation.

After performing the message transformation, at a block 358, the default value application module 240 determines if any default value need to be applied to the transformed message. Such default values may be set up with the original installation of the integration engine 206 or provided by a user using the setting administration module 244.

Subsequently, at a block 360, the post-action module allows a user to link any custom logic to the transformed outgoing message. A user may specify such custom logic by creating his or her own assembly and linking such assembly to the post action module via the setting administration module 244. At this point the transformed message may be deemed ready to be sent to the destination application and is handed over to the send adapter 230.

As one of ordinary skill in the art would appreciate, one or more sections of the application integration system 200 may be implemented using hardware, software, firmware or any combination thereof. Moreover, as one of ordinary skill in the art would appreciate, not all the blocks of the application integration program 400 need to be performed for a given implementation of the application integration system 200. As some of the blocks of the application integration program 400 may be used primarily to increase the efficiency of the application integration program 400, one or more such blocks may be omitted in a given implementation without affecting the functionality of the application integration system 200. Moreover, one or more of the blocks in the application integration program 400 may also be implemented in an alternate order without affecting the functionality of the application integration system 200.

Figure 7:
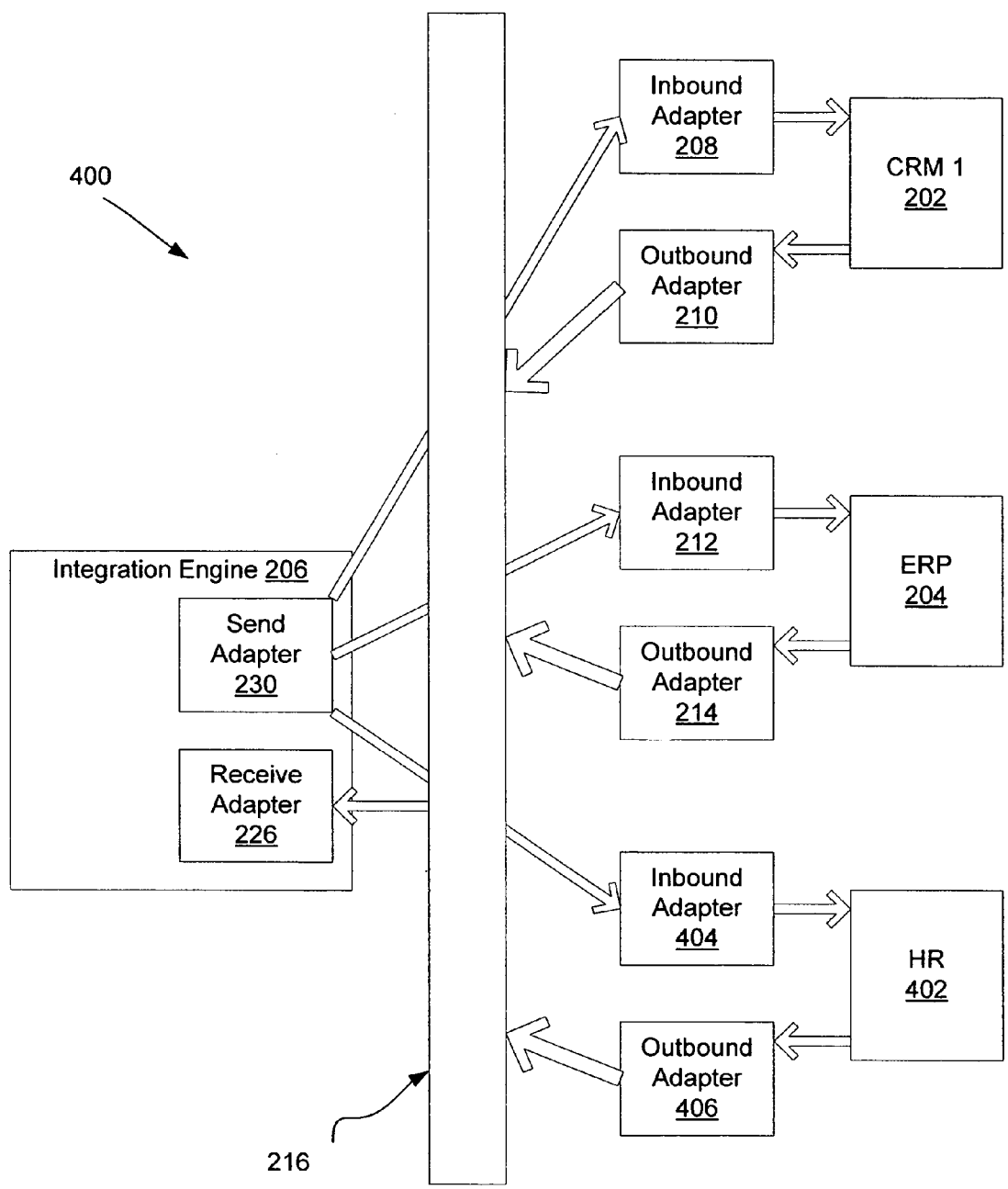
FIG. 7 illustrates an example of a multiple application integration system.

Now referring to FIG. 7, an example of a multiple application integration system 400. The multiple application integration system 400 is functionally very similar to the application integration system 200 illustrated in FIG. 3. Therefore, various reference numerals of the multiple application integration system 400 are same as the corresponding reference numerals of the application integration system 200. Specifically, the multiple application integration system 400 includes the integration engine 206 working with a number of applications, in this case, the CRM application 202, the ERP application 204 and an HR application 402.

Each of the applications 202, 204 and 402 may communicate with the message transport 216 using its respective outbound adapter. Subsequently, the integration engine 206 retrieves messages from the message transport 216 and processes them internally. The internal structure of the integration engine 206 is discussed above with respect to FIGS. 3 and 4. The integration engine 206 may be adapted to determine the source of the message retrieved from the message transport 216 and the destination of the message once it is processed. The send adapter 230 of the integration engine 206 may communicate the outgoing message to an inbound adapter of respective destination application.

While the multiple application integration system 400 illustrates the integration engine 206 working with three applications 202, 204 and 402, as one of ordinary skill in the art would appreciate, any alternate number of applications may be integrated in a similar manner.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A computer executed application integration system for integrating a plurality of computer executed applications, the system comprising:
    a memory comprising computer executable instructions;
    a processor in communication with the memory, the processor being configured to execute the computer executable instructions;
    the computer executable instructions comprising:
        a plurality of application adapters, each application adapter adapted to communicate with at least one of the plurality of applications using a defined set of application programming interface (API) calls; and
        an integration engine communicating with at least some of the application adapters, the integration engine including a receive adapter, a compound document module a pre-action module an orchestration module, a map application module, a default value application module, a post-action module, and a send adapter, wherein:
    the receive adapter is adapted to receive an update message from one of the plurality of applications,
    the compound document module is adapted to determine whether the update message includes a compound structure, and when the compound document module determines the update message includes the compound structure:
        break down the compound structure into separate individual messages,
            store the individual messages in an update queue, and communicate the individual messages in the update queue to the pre-action module as the update message,
    the pre-action module is adapted to determine whether the update message has a dependent message, and when the pre-action module determines the update message has the dependent message;
        store the update message in a pre-action queue, and
        store the dependent message in the pre-action queue,
    the orchestration module is adapted to select a document from the pre-action queue as a selected message, wherein the orchestration module first selects the dependent message and then selects the update message from the pre-action queue,
    the map application module is adapted to apply a schema map from a map repository to the selected message,
    the default value application module is adapted to assign default values to the selected message,
    the post-action module is adapted to allow a user to link customer logic to the selected message, and
    the send adapter is adapted to determine a destination of the selected message.

2. The application integration system of claim 1, wherein the computer executable instructions further comprise a data synchronization module adapted to allow the user to synchronize data between multiple applications of the plurality of applications.

3. The application integration system of claim 1, wherein the computer executable instructions further comprise an integration monitor module adapted to allow the user to monitor status of data integration between at least some of the plurality of applications.

4. The application integration system of claim 1, wherein the computer executable instructions further comprise a schema mapping module adapted to store a plurality of dynamic link library (DLL) files, each of the plurality of DLL files specifying mapping of the selected message from at least one of the plurality of applications to at least another of the plurality of applications.

5. The application integration system of claim 1, wherein the integration engine further comprises a messaging broker adapted to:
    receive the update message from the receive adapter;
    coordinate functioning of (1) the compound document module, (2) the pre-action module, (3) the map application module, (4) the default value application module, and (5) the post-action module; and
    send the update message to the send adapter.

6. The application integration system of claim 1, wherein the computer executable instructions are adapted to allow the user to view a status of the update message being processed by the application integration system.

7. The application integration system of claim 1, wherein the plurality of application adapters communicate with the integration engine using a message transport module.

8. The application integration system of claim 1, wherein the plurality of application adapters communicate with the integration engine using the Internet.

9. The application integration system of claim 1, wherein the integration engine further comprises an integration database adapted to store at least one of: (1) information about entities that integrated with the application integration system, (2) information about a criterion used to determine whether the update message includes the compound structure, (3) message related information that may be used by an integration monitor, (4) settings configured by a setting administration module, and (5) pre-action information to be used by the pre-action module.

10. A method of providing integration between a first application and a second application, the method comprising:
    receiving an update message from the first application;
    when the update message includes a compound structure, simplifying the compound structure to create a plurality of simple update messages;
    determining whether the update message has one or more dependent messages;
    when the update message has the one or more dependent messages:
        separating the update message into individual dependent messages;
        storing the individual dependent messages in a queue;
        selecting a next individual message in the queue as a selected message;
    applying a schema map from a map repository to the selected message;
    assigning default values to the selected message;
    allowing a user to link customer logic to the selected message;
    determining a destination of the selected message; and
    posting the selected message to an inbound adapter of the second application,
    wherein at least the applying the schema map is performed by a computing device.

11. The method of claim 10, wherein the following are coordinated by a messaging broker:
the simplifying the compound structure,
the determining whether the update message has one or more dependent messages,
the selecting the next individual dependent message,
the applying the schema map from the map repository to the selected message,
the assigning the default values to the selected message,
the allowing the user to link the customer logic to the selected message, and
the determining the destination of the selected message.

12. The method of claim 10, wherein the receiving the update message from the first application further comprises:
receiving the update message from the first application at an outbound adapter of the first application;
receiving the update message from the outbound adapter of the first application at a message transport queue; and
receiving the update message from the message transport queue at a receive adapter of a messaging broker.

13. The method of claim 10, further comprising publishing the selected message from the inbound adapter of the second application into the second application.

14. The method of claim 10, wherein applying the schema map to the selected message further comprises transforming the selected message from a first application related format to a second application related format.

15. The method of claim 10, further comprising monitoring data published in the first application and the second application to ensure that the first application and the second application are synchronized.

16. The method of claim 10, further comprising synchronizing data between the first application and the second application using a synchronization module adapted to:
allow the user to select a set of records from the first application;
transform the set of records; and
send the transformed set of records to the second application.

17. A computer program product for use with a computer system to integrate a first application and a second application, the computer program product comprising a computer readable memory or storage device having embodied therein program code that, when executed by a processing unit causes the processing unit to perform acts comprising:
receiving an update message from the first application;
verifying whether the update message includes a compound structure;
when the update message includes the compound structure, simplifying the compound structure to create a plurality of simple update messages;
determining whether the update message has a dependent message;
when the update has the dependent message:
separating the update message into one or more individual dependent messages,
storing the one or more individual dependent messages in a queue, and
selecting a next individual dependent message in the queue as a selected message,
applying a schema map from a map repository to the selected message;
assigning default values to the selected message;
allowing a user to link customer logic to the selected message; and
posting the selected message to an inbound adapter of the second application.

18. The computer program product of claim 17, the acts further comprising coordinating at least the simplifying and the selecting using a messaging broker.

* * * * *